US007248286B2

(12) United States Patent
Cho

(10) Patent No.: US 7,248,286 B2
(45) Date of Patent: Jul. 24, 2007

(54) APPARATUS AND METHOD FOR CONTROLLING A CAMERA USING A VIDEO COMPRESSION ALGORITHM

(75) Inventor: Jae-soo Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 855 days.

(21) Appl. No.: 10/225,154

(22) Filed: Aug. 22, 2002

(65) Prior Publication Data

US 2003/0081130 A1 May 1, 2003

(30) Foreign Application Priority Data

Oct. 29, 2001 (KR) .............................. 2001-66851

(51) Int. Cl.
*H04N 5/228* (2006.01)
*H04N 5/225* (2006.01)
*H04N 7/18* (2006.01)
*H04N 5/14* (2006.01)
*H04N 7/12* (2006.01)
*G06K 9/00* (2006.01)

(52) U.S. Cl. ................. 348/208.14; 348/169; 348/154; 348/155; 348/699; 375/240.16; 382/103

(58) Field of Classification Search ............ 348/208.14
See application file for complete search history.

(56) References Cited

U.S. PATENT DOCUMENTS 5,237,405 A * 8/1993 Egusa et al. ............. 348/208.1
5,325,206 A * 6/1994 Fujita et al. ................ 348/352
5,355,163 A * 10/1994 Tomitaka ............... 348/208.14
5,467,127 A * 11/1995 Jong-Pil ..................... 348/169
5,790,686 A * 8/1998 Koc et al. ................... 382/107
6,115,067 A * 9/2000 Koyama .................. 348/240.3

(Continued)

FOREIGN PATENT DOCUMENTS

EP 0 619 552 A1 3/1994

(Continued)

OTHER PUBLICATIONS

Lorenzo Favalli et al., "Object Tracking and Hypermedia Links Creation in MPEG-2 Digital Video Sequences", Circuits and Systems, pp. 261-264, Proceedings of the 1998 IEEE International Symposium on Monterey, CA.

(Continued)

*Primary Examiner*—David Ometz
*Assistant Examiner*—Nhan T. Tran
(74) *Attorney, Agent, or Firm*—Roylance, Abrams, Berdo & Goodman, L.L.P.

(57) ABSTRACT

A method for controlling a camera using an image compression algorithm. A motion region and a motionless region are determined with respect to an input image based on a motion vector of a macro block which is for the generation of compressed data from the input image. A center value and a size of a moving object is estimated from the motion region. According to the center value and the size of the moving object, the camera is controlled to track and photograph the moving object. Accordingly, a central processing unit of the moving object tracking system is relieved of substantial processing load, and the processing speed of the system is improved.

40 Claims, 8 Drawing Sheets

U.S. PATENT DOCUMENTS

| | | | | |
|---|---|---|---|---|
| 6,498,628 | B2 * | 12/2002 | Iwamura | 348/169 |
| 6,507,366 | B1 * | 1/2003 | Lee | 382/103 |
| 6,618,441 | B1 * | 9/2003 | Hasegawa | 348/699 |
| 6,707,486 | B1 * | 3/2004 | Millet et al. | 348/154 |
| 6,778,605 | B1 * | 8/2004 | Hamanaka | 375/240.16 |
| 6,993,158 | B2 * | 1/2006 | Cho et al. | 348/169 |

FOREIGN PATENT DOCUMENTS

| | | | |
|---|---|---|---|
| EP | 0689357 | | 12/1995 |
| FR | 2773937 | | 7/1999 |
| JP | 06-339056 | * | 12/1994 |
| JP | 08-069597 | | 3/1996 |
| JP | 09-153138 | | 6/1997 |
| JP | 09-182078 | * | 7/1997 |
| JP | 09-297850 | | 11/1997 |
| JP | 2000-032435 | | 1/2000 |

OTHER PUBLICATIONS

Jeffrey A. Fayman et al., "Zoom Tracking", Robotics and Automation, pp. 2783-2788, 1998 IEEE, International Conference Leuven, Belgium, May 16-20, 1998.

* cited by examiner

| | | | |
|---|---|---|---|
| 0 | 0 | 0 | 0 |
| 0 | 0 | 2 | 2 |
| 0 | 2 | 2 | 2 |
| 0 | 0 | 2 | 1 |
| 0 | 0 | 0 | 0 |

MOTION REGION (A)

$$\text{MOVING DISTANCE} = \text{Max}(|A|, |B|) \geq \text{THRESHOLD} = 2$$

| | | | |
|---|---|---|---|
| (0,0) | (0,0) | (0,0) | (0,0) |
| (0,0) | (0,0) | (0,-1) | (-1,2) | 

| | | | |
|---|---|---|---|
| (0,0) | (0,0) | (0,0) | (0,0) |
| (0,0) | (0,-1) | (-1,2) | (-2,-1) |
| (0,0) | (1,-2) | (-2,0) | (-1,-2) |
| (0,0) | (0,0) | (-1,-2) | (0,-1) |
| (0,0) | (0,0) | (0,0) | (0,0) |

APPARATUS AND METHOD FOR CONTROLLING A CAMERA USING A VIDEO COMPRESSION ALGORITHM

This application claims benefit under 35 U.S.C. §119 from Korean Patent Application No. 2001-66851, filed on Oct. 29, 2001, the entire content of which is incorporated herein by reference.

BACKGROUND OF THE INVENTION

1. Field of the Invention

The present invention relates to a system for photographing an object, and more particularly, to a method for controlling a camera with motion information of the object that is obtained during compression of input images.

2. Description of the Prior Art

Generally, digital photography systems use data compression techniques to reduce the volume of data, and thereby record a greater volume of image data during the shooting, facilitating transmission of the photographed information to a remote area. For example, a digital television transmission system compresses the image data obtained by the camera, and transmits the compressed image signals as broadcasting signals.

FIG. 1 is a flowchart showing the conventional image compression method for an image compression/recovery system. When the image information of the object photographed by the camera is input (step S11), the image compression/recovery system performs pre-processing of the input image (step S12). That is, signal processing is performed on the raw camera input to remove and prevent noise from the input images. Then, by comparing such processed images with the preceding frames, a motion vector of a macro block is calculated (step S13). Next, post-processing is performed to compress the input images (step S14). Digital encoding is performed (step S15), and finally compressed data of the input images is generated (step S16).

The 'motion vector' of the macro block, which is used to compress the image data, indicates a direction of an object moving among the image signals of the preceding and following frames. The motion vector is represented in two dimensions, i.e., in the horizontal and vertical directions. For example, if the motion vector of a particular macro block shows the values of (2, −3), it means the motion vector of the particular macro block has moved by two pixels in the horizontal direction, and by −3 pixels in the vertical direction.

Through the above-described compression of data, image data can be stored and transmitted to a remote area in greater volume and at a higher speed.

In certain applications, automatic tracking systems are advantageous. Automatic tracking systems are able to control a camera to track a moving object through signal processing of the input images.

FIG. 2 is a flowchart illustrating a conventional camera controlling process. When the image is input (step S21), the system performs pre-processing with respect to the input image (step S22). Next, the input image is divided into a plurality of areas (step S23). The plurality of areas is categorized into a background region and a motion region, so that the moving object is extracted (step S24). Then, the size and the motion information of the extracted moving object are obtained (step S25). Based on the size and motion information of the extracted moving object, pan/tilt and zoom-in/zoom-out of the camera is controlled (step S26).

Through the above-described processes, the moving object is automatically tracked, and thus, the photographing is performed.

Typically, automatic tracking systems use image compression algorithms, such as those described above, to reduce storage and transmission requirements. Research is currently underway to develop an image compression algorithm that would enable the transmission of the moving object being tracked to a remote location using the internet or a wireless communication network.

However, in conventional automatic moving object tracking systems as described above, the process of compressing the input image and the process of tracking the moving object are performed independently of each other. Because the process of compressing the input image and the process of processing the input image for camera control are currently performed separately, control units are subjected to considerable overload and unnecessary power consumption.

SUMMARY OF THE INVENTION

Accordingly, it is an object of the present invention to provide an apparatus and method for controlling a camera using compression information, which is capable of controlling the camera to track and photograph a moving object based on the information generated in the process of input image compression.

The above object is accomplished by an apparatus and method for controlling a camera using information related to an image compression algorithm according to an embodiment of the present invention, including the steps of determining a motion region and a motionless region of an input image photographed by the camera by using a motion vector of a macro block for generating compressed data of the input image; estimating a center value and a size of a moving object from the motion region; and controlling the camera so that the camera tracks and photographs the moving object using the estimated center value and size.

The step of determining the motion region and the motionless region of the input image comprises the steps of calculating a moving distance of the macro block; and determining the motion region and the motionless region according to a comparison between the calculated moving distance of the macro block and a threshold.

The size of the moving object is preferably determined as an area of a square that surrounds the boundary of the motion region. The center of the square is preferably used as the center of the moving object. The determined size of the moving object is used for zoom-in/out control during the shooting. The determined center value of the moving object is also used for the pan/tilt control during the shooting.

Further provided is the step of setting the area within the square as a tracking window for tracking the moving object, estimating a moving location of the moving object based on preceding frames within the square, and moving the tracking window according to the estimated moving location. A camera controlling step controls a photographing direction of the camera. The camera direction can be shifted based on the estimated information of the tracking window, when a center value of the tracking window exists outside of a preset entire area of the input image.

The estimation of the center value of the moving object and the estimation of the size of the moving object are performed on a time-divided basis.

The invention is further susceptible to implementation as a computer readable medium of instructions for controlling a camera to track and photograph a moving object based on the information generated in the process of input image compression.

According to an embodiment of the present invention, the camera controlling method uses image compression information to control the movement of the camera. Pan/tilt and zoom-in/zoom-out can be controlled based on the moving vectors which are calculated for the conventional image compression, while advantageously omitting the image processing step for tracking the moving object.

BRIEF DESCRIPTION OF THE DRAWINGS

The above-mentioned objects and features of the present invention will be more apparent from the following detailed description of a preferred embodiment of the present invention when read with reference to the appended drawings, in which.

DETAILED DESCRIPTION OF THE PREFERRED EMBODIMENT

The present invention will now be described in greater detail with reference to the preferred embodiment illustrated in the accompanying drawings.

Figure 1:
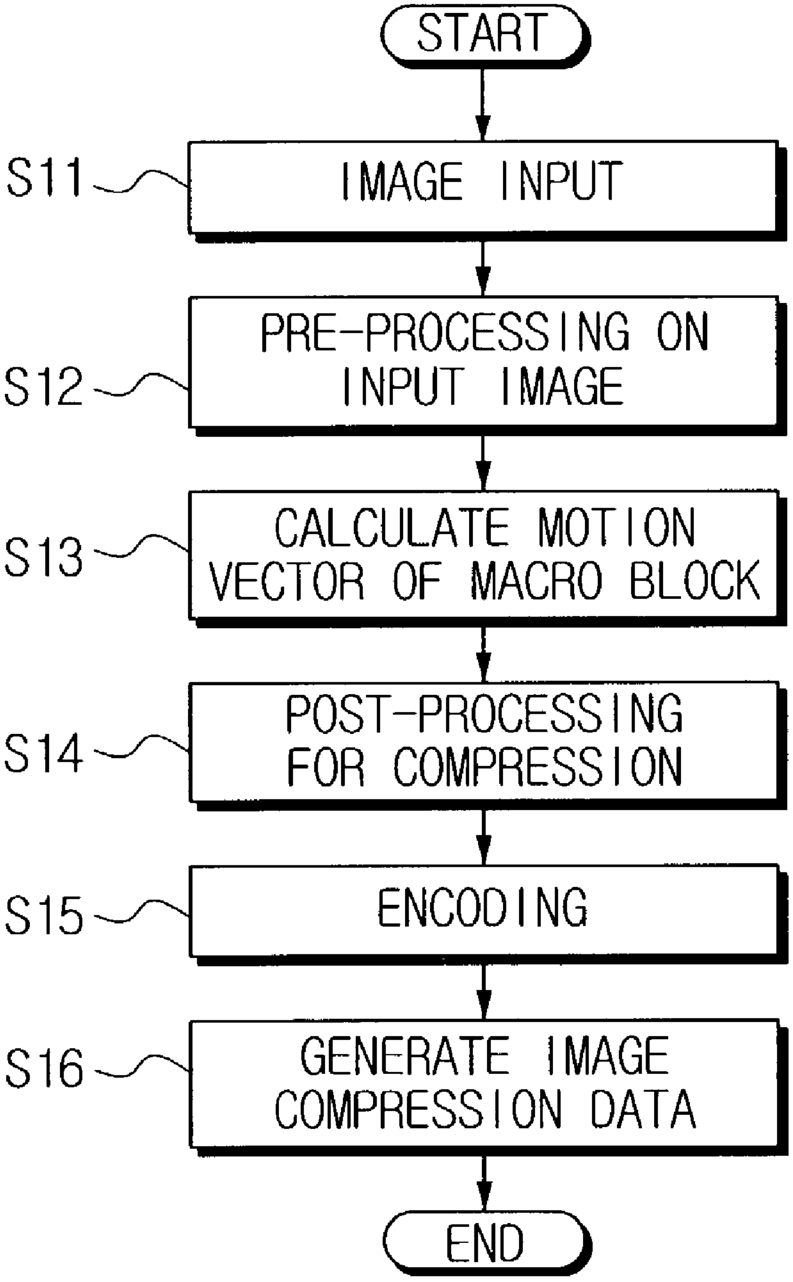
FIG. 1 is a flowchart illustrating a conventional image compressing method.
Figure 2:
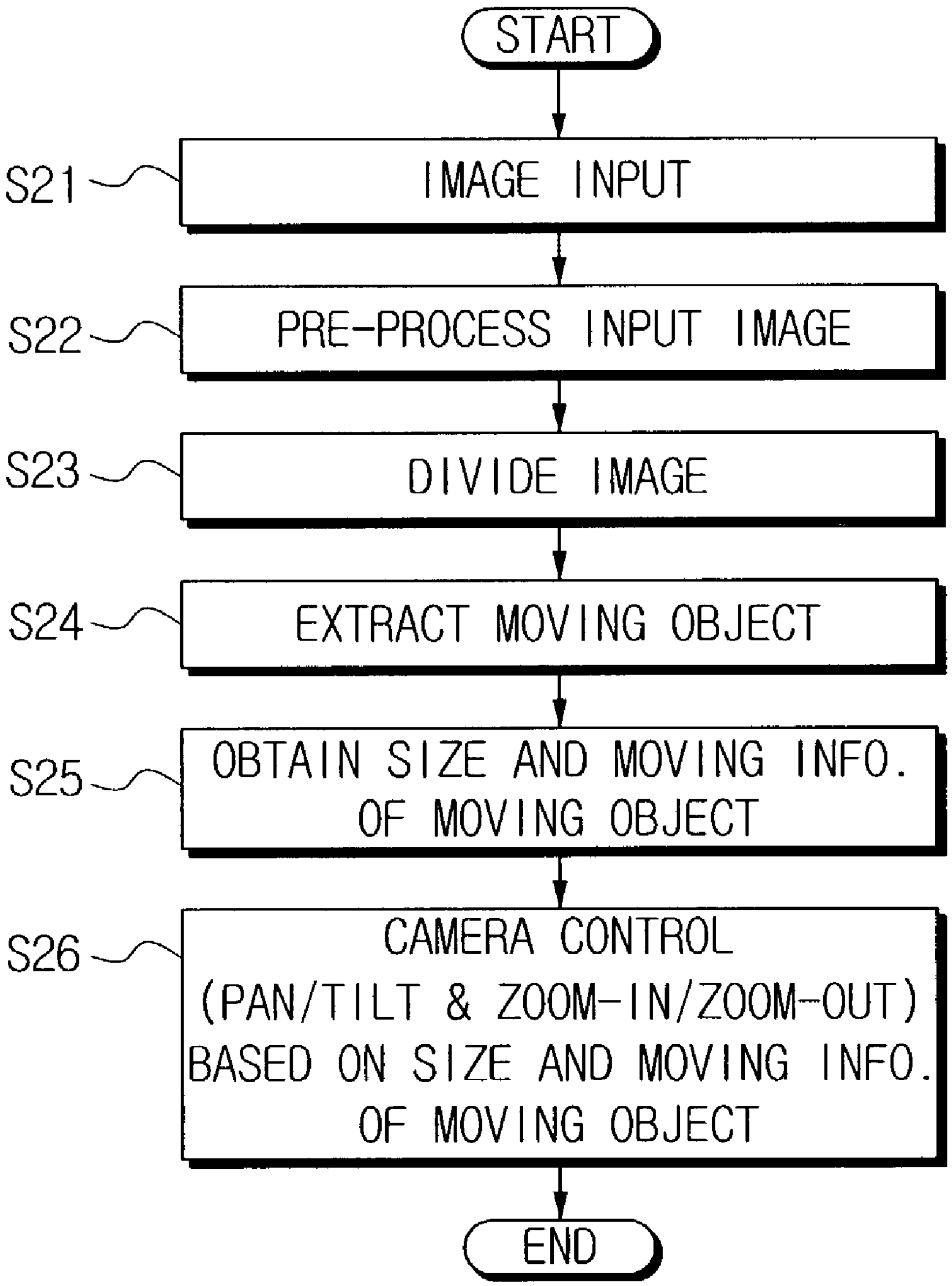
FIG. 2 is a flowchart illustrating a conventional method for automatically tracking a moving object by using an image signal.
Figure 3:
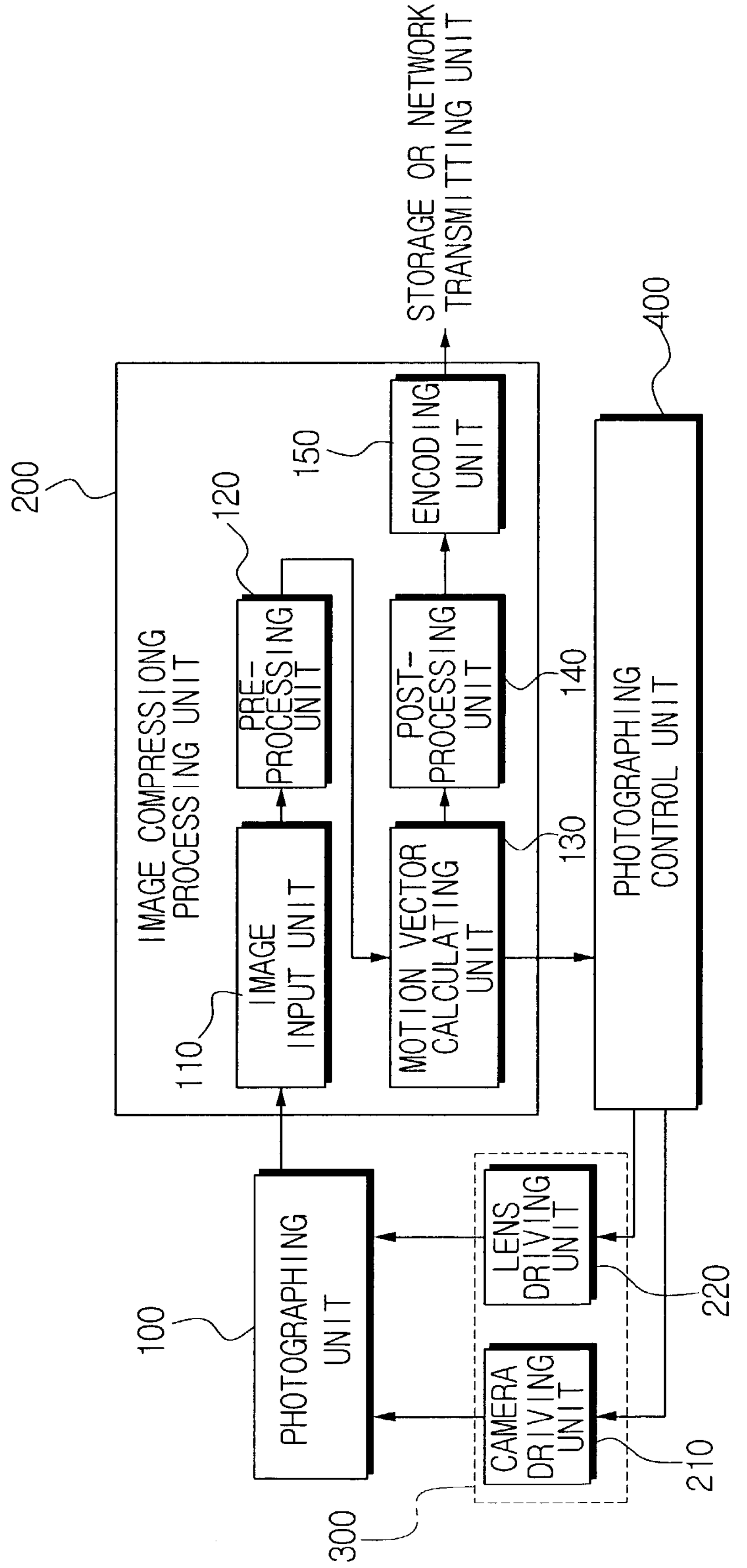
FIG. 3 is a block diagram of an automatic moving object tracking system according to an embodiment of the present invention.

FIG. 3 is a block diagram showing a moving object tracking system according to the preferred embodiment of the present invention. The moving object tracking system includes a photographing unit 100, an image compression processing unit 200, a driving unit 300 and a photographing control unit 400.

The photographing unit 100 includes a lens (not shown) and a charge coupled device (not shown), and generates image signals while photographing a monitoring area.

The image compression processing unit 200 performs data compression in order to reduce the volume of data transmitted from the photographing unit 100, and outputs the compressed data to a storage device (not shown) or to a network transmitting device (not shown). For this purpose, the image compression processing unit 200 includes an image input unit 110 for receiving the image transmitted from the photographing unit 100, a pre-processing unit 120 for pre-processing the input image, a motion vector calculating unit 130 for calculating a motion vector based on a difference between the pre-processed input images and the preceding frames, a post-processing unit 140 for post-processing in relation to the compression of the input image for which the motion vector is calculated, and an encoding unit 150 for generating compressed data according to the data characteristics of the post-processed input images.

The driving unit 300 drives the photographing unit 100 according to the control signal output from the photographing control unit 400. Accordingly, the driving unit 300 includes a lens driving unit 220 for adjusting the lens for pan/tilt and zoom-in/zoom-out with respect to the input images, and a camera driving unit 210 for shifting the direction of the photographing unit 100 to track and photograph the moving object.

The photographing control unit 400 estimates the size B and a center value C of the moving object from the motion vectors of the macro block calculated from the motion vector calculating unit 130 of the image compression processing unit 200, and controls the photographing unit 100 through the driving unit 300.

Figure 4:
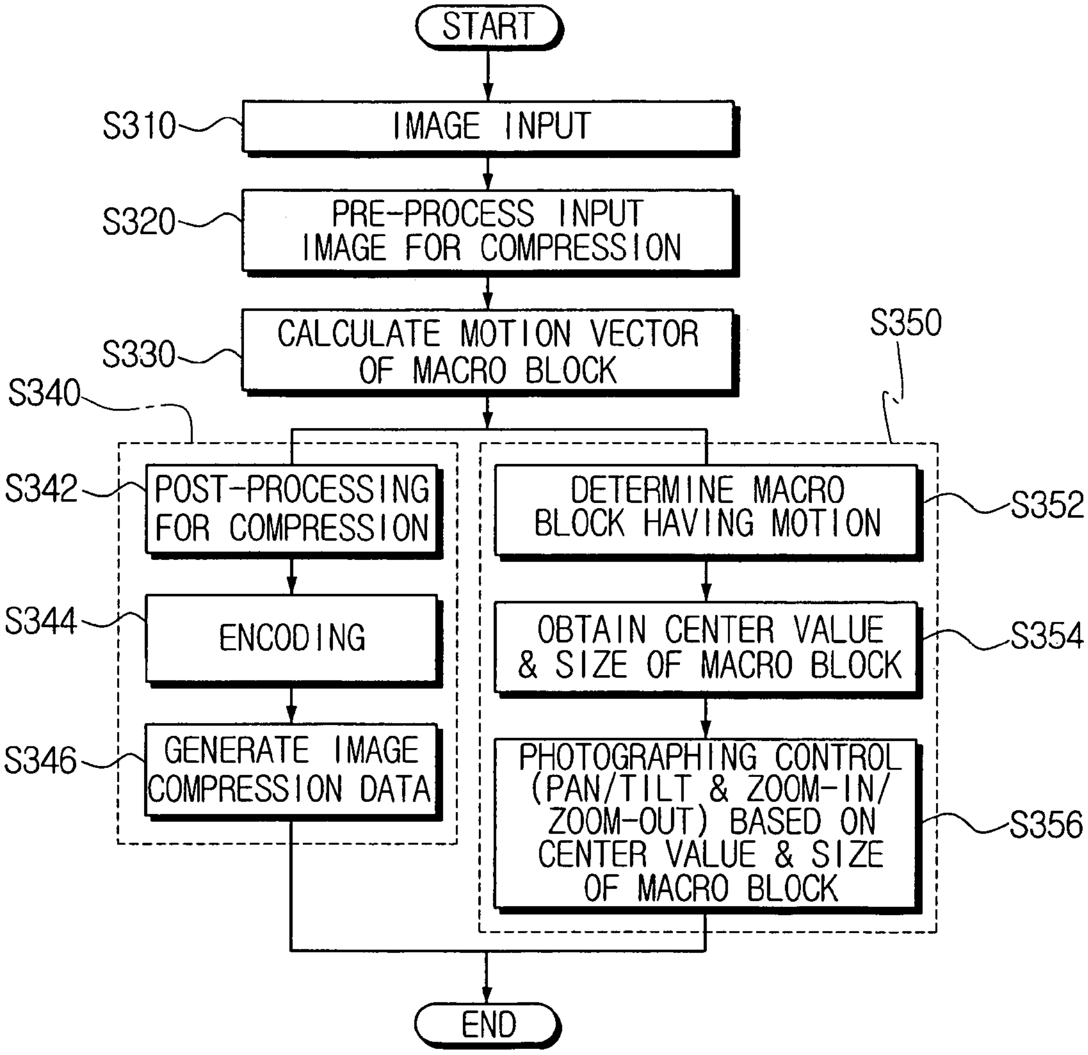
FIG. 4 is a flowchart illustrating the operation of the automatic tracking system of FIG. 3.

FIG. 4 is a flowchart illustrating the operation of the moving object tracking system of FIG. 3.

First, when an object is photographed through the photographing unit 100 (step S310), the pre-processing unit 120 pre-processes the input images that are input through the image input unit 200 (step S320). After the pre-processing, the images are compared with the preceding frames and thus, the motion vector of the macro block is calculated at the motion vector calculating unit 130 (step S330).

For the input images, for which the motion vectors are calculated, the compressed data is generated based on a binary data array characteristic of the input images (step S340). In other words, after the compression-related post-processing of the post-processing unit 140 (step S342), the post-processed input images are coded in the encoding unit 150 (step S344), and as a result, the compressed data is generated (step S346).

Meanwhile, the photographing control unit 400 controls the photographing unit 100 by obtaining the information about the moving object based on the motion vectors calculated at the motion vector calculating unit 130, and outputting a control signal based on the obtained information (step S350).

The process of controlling the photographing unit 100 by using the calculated motion vectors will be described below in greater detail.

Figure 5:
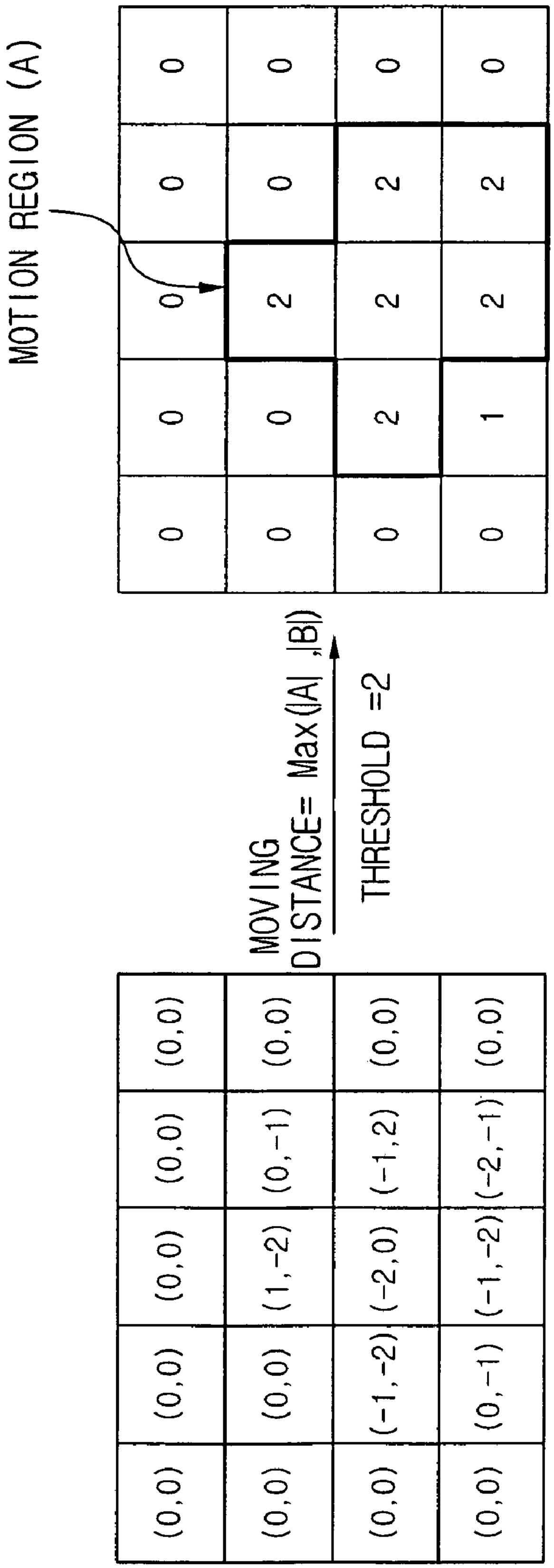
FIG. 5 illustrates the process of determining a motion region and a motionless region from the motion vectors of the macro block.

First, the photographing control unit 400 receives the motion vectors calculated at the motion vector calculating unit 130, and determines a motion region and a motionless region of the input image (step S352). To determine the motion region of the input image, the photographing control unit 400 calculates a moving distance of the moving object from the motion vectors of the macro block (FIG. 5), and compares the calculated moving distance with a threshold for determining the motion region of the macro block. Referring to FIG. 5, the moving distance of the macro block is obtained by the following equation:

$$\text{MOVINGDISTANCE}=\text{MAX}(|A|,|B|) \quad \text{[Equation 1]}$$

where A is a motion vector in a horizontal direction, and B is a motion vector in a vertical direction.

Referring to FIG. 5, when the moving distance of the macro block is greater than the threshold '2', the macro block is determined to be a motion macro block. When the moving distance of the macro block is less than the threshold 2, the macro block is determined to be a motionless macro block. The right-hand of FIG. 5 shows the motion region A determined after the comparison of the threshold and the moving distance of the macro block.

The moving distance of the macro block can be expressed in many forms, such as following equation, for example.

$$MOVINGDISTANCE=\sqrt{A^2+B^2} \quad \text{[Equation 2]}$$

Figure 6:
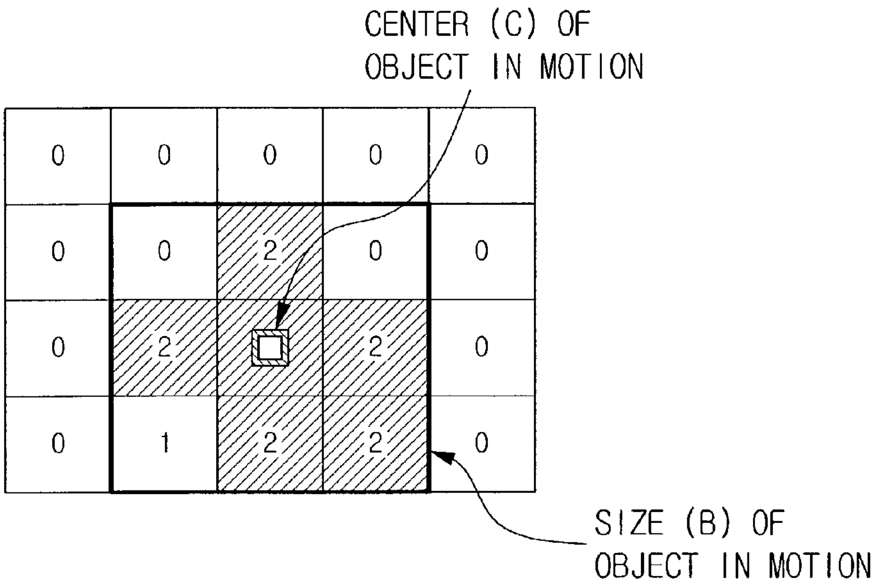
FIG. 6 illustrates the process of estimating a size and a center value of a moving object.

When the motion region and the motionless region are determined with respect to the input image, the photographing control unit 400 estimates information about the size B and center value C of the moving object from the motion region A. As shown in FIG. 6, the size B of the moving object is determined based on the area of the square that surrounds the boundary of the motion region. The center value C of the moving object is determined based on the center of the square that represents the size B of the moving object.

Figure 7:
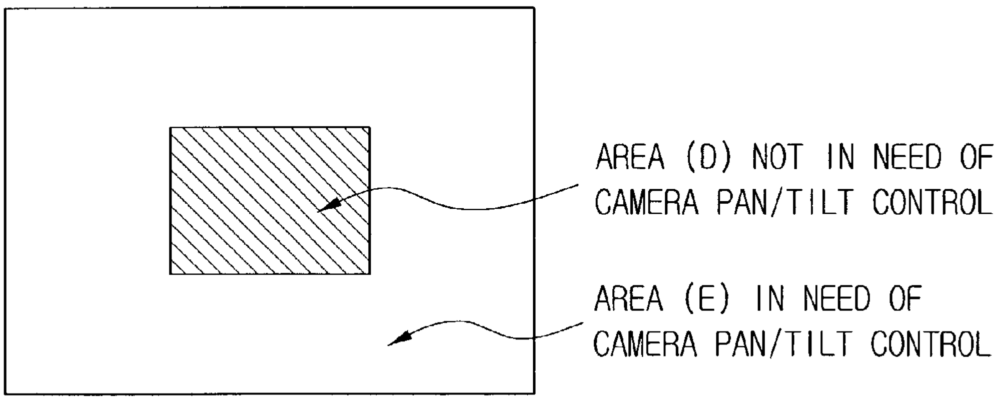
FIG. 7 illustrates a pan/tilt control region of a camera.
Figure 8:
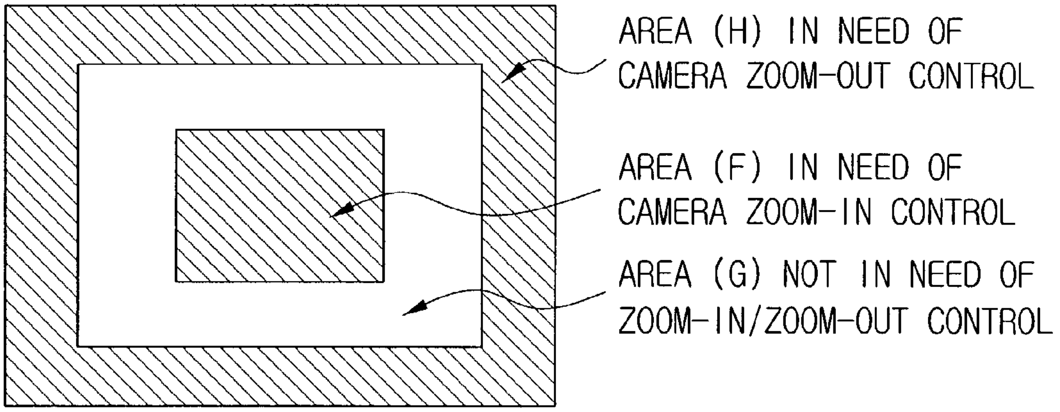
FIG. 8 illustrates a zoom-in/zoom-out control region of a camera.

Referring back to FIG. 4, the photographing control unit 400 controls the photographing unit 100 by outputting to the driving unit 300 a photographing control signal according to the information about the size B and the center value C of the moving object (step S356). In order to maintain a constant occupancy rate of the moving object on an image plane according to the size B of the moving object, a zoom-in/zoom-out control signal is output to the lens driving unit 220 to control zoom-in/zoom-out of the photographing unit 100. Furthermore, in order to align the center of the moving object with the center of the image plane according to the center value C of the moving object, a pan/tilt control signal is output to the lens driving unit 220 to control the pan/tilt of the photographing unit 100. Also, in order to prevent shaky movement from occurring in the screen due to over-control, the pan/tilt control of the photographing unit 100 is only performed when the center value C of the moving object is located in an off-area E that is defined outside of a preset area D (FIG. 7). The zoom-in/zoom-out control of the photographing unit 100 is also performed in a manner such that the zooming-in is performed when the size B of the moving object exists inside F of a preset entire area G of the input image, while zooming-out is performed when the size B of the moving object exist outside H of the preset entire area C (FIG. 8).

The photographing control unit 400 can set the area within the square as a tracking window for tracking the movement of the moving object, and track the moving object by moving the tracking window to a moving object's location. Here, the moving object's location is estimated based on the preceding frames within the square. When the center value of the tracking window exists outside of the preset entire area of the input image, the shooting direction of the photographing unit 100 is controlled according to the estimated information of the tracking window as a control signal is output to the camera driving unit 210 to shift the direction of the camera.

Figure 9:
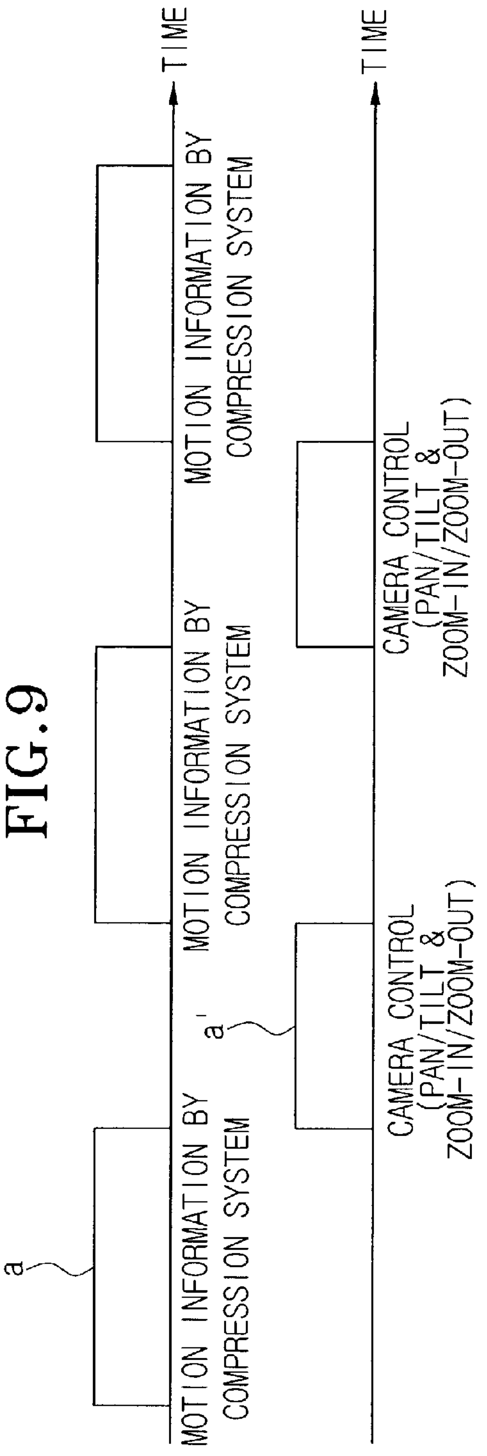
FIGS. 9 and 10 are timing views showing the camera control time and the information tracking time, respectively.
Figure 10:
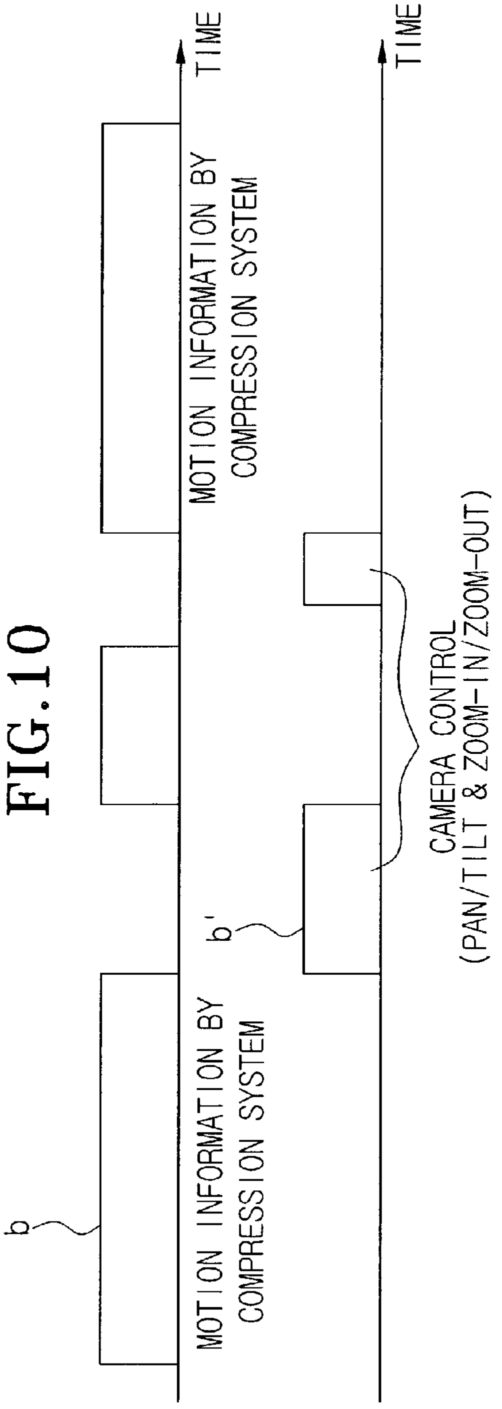

During the controlling of the camera, there are motion vectors of the input image that are generated by the movement of the camera, and not by the actual movement of the object. Such generated motion vectors are preferably not used. Accordingly, time-division is utilized such that the camera controlling time α' and the estimating time a for the size and center value of the moving object are performed as shown in the timing view of FIG. 9. FIG. 10 is a timing view showing the time for moving object information b and a camera control b'.

As described above, with the camera controlling method using the compression-related information according to an embodiment of the present invention, significant advantages are realized. As the basic information for object tracking is obtained from the image compression system, the load to the central processing unit is significantly reduced from that of the conventional moving object tracking system. Also, because the image compressing function and the photographing controlling function are combined with each other, cost-effectiveness is achieved.

Of course it will be apparent to those of skill in the art that the above described concepts can be implemented in a software embodiment. Such an embodiment comprises a computer readable medium of instructions for controlling a camera to track and photograph a moving object based on the information generated in the process of input image compression, as described above.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A method for controlling a camera using information related to an image compression process, comprising the steps of:

determining a motion region and a motionless region of an input image photographed by the camera based on a motion vector of a macro block for generating a compressed data of the input image;

estimating a center value and a size of a moving object from the motion region; and controlling the camera so that the camera tracks and photographs the moving object based on the estimated center value and size.

2. The method of claim 1, wherein the step of determining the motion region and the motionless region of the input image comprises the steps of:

calculating a moving distance of the macro block; and determining the motion region and the motionless region according to a comparison between the calculated moving distance of the macro block and a threshold.

3. The method of claim 2, wherein the moving distance is calculated as the greater of an absolute change in a first direction and an absolute change in a second direction.

4. The method of claim 3, wherein the first direction is horizontal and the second direction is vertical.

5. The method of claim 2, wherein the moving distance is calculated as the square root of the sum of the square of a change in a first direction and the square of a change in a second direction.

6. The method of claim 5, wherein the first direction is horizontal and the second direction is vertical.

7. The method of claim 1, wherein the size of the moving object determined as an area of a square that surrounds a boundary of the motion region.

8. The method of claim 1, further comprising the steps of:

setting an area within a square as a tracking window for tracking the moving object, estimating a moving location of the moving object based on preceding frames within the square, and moving the tracking window according to the estimated moving location.

9. The method of claim 8, wherein the camera controlling step controls so that a photographing direction of the camera is shifted based on the estimated tracking window when a center value of the tracking window exists outside of a preset entire area of the input image.

10. The method of claim 1, wherein the camera controlling step controls a pan/tilt of the camera according to the estimated center value of the moving object.

11. The method of claim 10, wherein the pan/tilt controlling of the camera is performed when the center value of the moving object exists outside of the preset entire area of the input image.

12. The method of claim 1, wherein the camera controlling step controls a zoom-in/zoom-out of the camera according the estimated size of the moving object.

13. The method of claim 12, wherein the controlling step is performed such that the zoom-in is performed when the moving object exists inside of the preset entire area of the input image, while the zoom-out is performed when the moving object exists outside of the preset entire area of the input image.

14. The method of claim 1, wherein the controlling step performed such that the estimation of the center value of the moving object and the estimation of the size of the moving object are performed on a time-divisional basis.

15. An apparatus for controlling a camera using information related to an image compression process, comprising:

a photographing unit;

an image compression processing unit adapted to determine a motion region and a motionless region of an input image photographed by the photographing unit based on a motion vector of a macro block of the input image for generating compressed data representing the input image, and further adapted to estimate a center value and a size of a moving object from the motion region; and a photographing control unit adapted to control the photographing unit so that the photographing unit tracks and photographs the moving object based on the estimated center value and size.

16. The apparatus of claim 15, wherein the image compression processing unit is further adapted to calculate a moving distance of the macro block and determine the motion region and the motionless region according to a comparison between the calculated moving distance of the macro block and a threshold.

17. The apparatus of claim 16, wherein the image compression processing unit is further adapted to calculate the moving distance as the greater of an absolute change in a first direction and an absolute change in a second direction.

18. The apparatus of claim 17, wherein the first direction is horizontal and the second direction is vertical.

19. The apparatus of claim 16, wherein the image compression processing unit is further adapted to calculate the moving distance as the square root of the sum of the square of a change in a first direction and the square of a change in a second direction.

20. The apparatus of claim 19, wherein the first direction is horizontal and the second direction is vertical.

21. The apparatus of claim 15, wherein the image compression processing unit is adapted to determine the size of the moving object as an area of a square that surrounds a boundary of the motion region.

22. The apparatus of claim 21, wherein the image compression processing unit is further adapted to set the area within the square as a tracking window for tracking the moving object, estimate a moving location of the moving object based on preceding frames within the square, and move the tracking window according to the estimated moving location.

23. The apparatus of claim 22, wherein the photographing control unit is adapted to control a direction of the photographing unit based on the estimated tracking window when a center value of the tracking window exists outside of a preset entire area of the input image.

24. The apparatus of claim 15, wherein the photographing control unit is adapted to control a pan/tilt of the photographing unit according to the estimated center value of the moving object.

25. The apparatus of claim 24, wherein the photographing control unit is further adapted to control the pan/tilt of the photographing unit when the center value of the moving object exists outside of a preset entire area of the input image.

26. The apparatus of claim 15, wherein the photographing control unit is adapted to control a zoom-in/zoom-out of the photographing unit according the estimated size of the moving object.

27. The apparatus of claim 26, wherein the photographing control unit is further adapted to control the photographing unit to zoom-in when the moving object exists inside of the preset entire area of the input image, and to zoom-out when the moving object exists outside of the preset entire area of the input image.

28. A computer readable medium having instructions stored thereon for controlling a camera using information related to an image compression process when the instructions are executed by a computer, comprising:

a first set of instructions, adapted to determine a motion region and a motionless region of an input image photographed by the camera based on a motion vector of a macro block for generating a compressed data of the input image;

a second set of instructions, adapted to estimate a center value and a size of a moving object from the motion region; and a third set of instructions, adapted to control the camera so that the camera tracks and photographs the moving object based on the estimated center value and size.

29. The computer readable medium having instructions of claim 28, wherein the first set of instructions further comprises:

a fourth set of instructions, adapted to calculate a moving distance of the macro block; and a fifth set of instructions, adapted to determine the motion region and the motionless region according to a comparison between the calculated moving distance of the macro block and a threshold.

30. The computer readable medium having instructions of claim 29, wherein the fourth set of instructions is adapted to calculate the moving distance as the greater of an absolute change in a first direction and an absolute change in a second direction.

31. The computer readable medium having instructions of claim 30, wherein the first direction is horizontal and the second direction is vertical.

32. The computer readable medium having instructions of claim 29, wherein the fourth set of instructions is adapted to calculate the moving distance as the square root of the sum of the square of a change in a first direction and the square of a change in a second direction.

33. The computer readable medium having instructions of claim 32, wherein the first direction is horizontal and the second direction is vertical.

34. The computer readable medium having instructions of claim 28, wherein the second set of instructions is adapted to estimate the size of the moving object as an area of a square that surrounds a boundary of the motion region.

35. The computer readable medium having instructions of claim 28, further comprising:

a sixth set of instructions, adapted to set an area within a square as a tracking window for tracking the moving object;

a seventh set of instructions, adapted to estimate a moving location of the moving object based on preceding frames within the square; and an eighth set of instructions, adapted to move the tracking window according to the estimated moving location.

36. The computer readable medium having instructions of claim 35, wherein the third set of instructions is further adapted to control the camera to shift a photographing direction of the camera based on the estimated tracking window when a center value of the tracking window exists outside of a preset entire area of the input image.

37. The computer readable medium having instructions of claim 28, wherein the third set of instructions is adapted to control a pan/tilt of the camera according to the estimated center value of the moving object.

38. The computer readable medium having instructions of claim 37, wherein the third set of instructions is adapted to control the camera pan/tilt when the center value of the moving object exists outside of the preset entire area of the input image.

39. The computer readable medium having instructions of claim 28, wherein the third set of instructions is adapted to control the zoom of the camera according the estimated size of the moving object.

40. The computer readable medium having instructions of claim 39, wherein the third set of instructions is adapted to control the camera to zoom-in when the moving object exists inside of the preset entire area of the input image, and to zoom-out when the moving object exists outside of the preset entire area of the input image.

* * * * *